(12) United States Patent
Meeker et al.

(10) Patent No.: US 6,908,151 B2
(45) Date of Patent: Jun. 21, 2005

(54) ADJUSTABLE AND FOLDABLE BOOSTER CAR SEAT

(75) Inventors: Paul K. Meeker, Hiram, OH (US); William R. Gibson, Kent, OH (US)

(73) Assignee: Meeker R&D, Inc., Hiram, OH (US)

( * ) Notice: Subject to any disclaimer, the term of this patent is extended or adjusted under 35 U.S.C. 154(b) by 141 days.

(21) Appl. No.: 10/248,998

(22) Filed: Mar. 7, 2003

(65) Prior Publication Data

US 2004/0124677 A1 Jul. 1, 2004

(51) Int. Cl.⁷ .............................................. B60N 2/26
(52) U.S. Cl. ........................... 297/250.1; 297/411.32
(58) Field of Search .................... 297/250.1, 411.32, 297/411.38

(56) References Cited

U.S. PATENT DOCUMENTS

| | | | | |
|---|---|---|---|---|
| 290,344 | A | * 12/1883 | Morris | 297/51 |
| 480,822 | A | * 8/1892 | Mayes | 297/250.1 |
| 2,461,367 | A | 2/1949 | Bonk | |
| 2,508,822 | A | 5/1950 | Goldberg | |
| 2,548,016 | A | 4/1951 | Goldberg | |
| 2,634,794 | A | 4/1953 | Young | |
| 2,924,266 | A | 2/1960 | Goldbert | |
| 4,640,550 | A | 2/1987 | Hakansson | |
| 4,818,023 | A | 4/1989 | Griesemer | |
| 4,854,639 | A | * 8/1989 | Burleigh et al. | 297/250.1 |
| 4,986,600 | A | 1/1991 | Leblanc et al. | |
| 5,158,337 | A | 10/1992 | Leggett | |
| 5,169,174 | A | 12/1992 | Gray | |
| 5,366,271 | A | 11/1994 | Johnston et al. | |
| 5,413,401 | A | 5/1995 | Koyanagi | |
| 5,472,236 | A | 12/1995 | Gray | |
| 5,551,751 | A | 9/1996 | Sedlack et al. | |
| 5,564,780 | A | 10/1996 | Presser et al. | |
| 5,678,887 | A | 10/1997 | Sher | |
| 5,722,731 | A | 3/1998 | Chang | |
| 5,733,004 | A | 3/1998 | Celestina-Krevn et al. | |
| 5,769,495 | A | * 6/1998 | Vairinen | 297/411.32 |
| 5,785,383 | A | 7/1998 | Otero | |
| 5,803,543 | A | * 9/1998 | Hartmann | 297/256 |
| 5,845,967 | A | 12/1998 | Kane et al. | |
| 5,845,968 | A | * 12/1998 | Lovie | 297/256.1 |
| 5,964,502 | A | 10/1999 | Stephens | |
| 6,079,780 | A | 6/2000 | Bapst | |
| 6,155,638 | A | 12/2000 | Bapst | |
| 6,196,629 | B1 | 3/2001 | Onishi et al. | |
| 6,273,509 | B1 | * 8/2001 | Reithmeier et al. | 297/410 |
| 6,336,682 | B1 | 1/2002 | Rosko | |
| 6,485,101 | B2 | * 11/2002 | Kassai et al. | 297/250.1 |
| 6,491,348 | B1 | * 12/2002 | Kain | 297/484 |
| 6,550,862 | B2 | * 4/2003 | Kain | 297/250.1 |
| 6,623,074 | B2 | * 9/2003 | Asbach et al. | 297/250.1 |
| 2002/0033632 | A1 | 3/2002 | Gibson et al. | |
| 2003/0090134 | A1 | 5/2003 | James et al. | |

* cited by examiner

*Primary Examiner*—Peter M. Cuomo
*Assistant Examiner*—Joseph Edell
(74) *Attorney, Agent, or Firm*—Buckingham, Doolittle & Burroughs, LLP; Louis F. Wagner

(57) ABSTRACT

The invention relates generally to an adjustable seat back and belt positioning juvenile booster car seat that folds compactly for easy transportation.

51 Claims, 12 Drawing Sheets

ADJUSTABLE AND FOLDABLE BOOSTER CAR SEAT

BACKGROUND OF INVENTION

The invention relates generally to an adjustable seat back belt positioning juvenile booster car seat that folds compactly for easy transportation, thereby reducing shipping costs as well as physical space requirements at the retail level.

Passenger restraint systems in automobiles are generally well suited to properly restrain adults but not well suited to properly restrain children. Accordingly, vehicle restraint systems must be supplemented by devices such as booster seats, which may be broadly defined as a seat that relies primarily on the vehicle's lap and shoulder belts to retain the seat in the vehicle and to restrain the child's torso. These seats include a seat portion to elevate the child above the vehicle's seating surface to a position in which the vehicle's shoulder belt is better positioned on the child and which properly positions the vehicle lap belt on the child's torso, and may also include a back portion. A common construction technique for booster seats with backs is to mold the seat and back portions from rigid plastic and cover them with a cushion or pad.

Known booster seat designs suffer from several drawbacks. First, the large L-shaped bodies tend to be relatively expensive and difficult to mold in one piece, especially if the seat includes wings and a lap belt path. Additionally, these booster seat designs suffer from a large size which is difficult to ship, store, package for manufacturers, and difficult to store and transport for consumers.

The manufacturing expense associated with a rigid molded body derives from the complex molding process required. One solution is to mold the seat as a plurality of separate, less complex, pieces and assemble the separate pieces into a rigid whole. Unfortunately, molding the seat as separate pieces requires additional tooling to mold the separate pieces and adds assembly steps, both of which add to the cost of manufacture. Thus, the savings due to less complex molding is offset by increased manufacturing and assembly costs and the seat is still large and bulky.

Therefore, what has been lacking in the industry is an easy to manufacture L-shaped car seat which is easily collapsed or foldable from an L-shaped position to a more compact position for ease of transportation and storage, yet which can be similarly, easily unfolded to its L-shaped use position.

Additionally, what has been lacking is the ability to further elongate or contract a car seat back to more accurately match the height of an occupant's head and shoulder with appropriately molded head restraint components of the seat back and shoulder belt path while maintaining a complete back support. Typically, the industry adopts a one-size-fits-all approach, which does not maximize the safety of the occupant by adjusting the seat size to fit the occupant. Those which adjust the headrest do not adjust the back, thus leaving an open area with no support. This disadvantage is eliminated by using the design of the present invention.

SUMMARY OF INVENTION

The general configuration for a belt-positioning booster car seat (generally intended for use with children weighing 30 to 80 or 100 pounds) is typically a molded plastic seat with a back and a seating surface. These surfaces have adjacent side walls that help contain and protect the child occupant. Slots or recesses on both sides of the seat in the occupants "hip area receive the lap belt portion of an auto belt restraint. Hooks or slots on both sides of the seat on the head/shoulder area receive the shoulder belt portion of the auto restraint in multiple height positions. The booster seat positions the auto belts to properly restrain the small occupant. The shoulder belt is especially important and the clips or slots on the shoulder area of the booster, when used properly, guide the belt across the occupants" shoulder and not on the head or neck. The lap belt is equally important and the slots in the hip area guide the lap belt across the bony pelvis, not the soft abdomen area.

Properly using a car seat is always an issue as seats that adapt to a wide range of occupants introduces the potential for misuse and inherent increased risk to children through that misuse. It has always been a goal of car seat designers to make fits to children better and adjustments easier and less confusing.

Typical bulkiness of a child's car seat is an issue that affects many levels. Transporting a large one-piece seat (when it is not being used as a restraint) is cumbersome and inconvenient for the consumer. Shipping and packaging a large seat is costly for the manufacturer, especially if shipping overseas and retail shelf space is always at a premium. If the booster seat could be folded, the drawbacks of a bulky one-piece seat could be reduced.

In one aspect of this invention, an effective means of securing a growing child from 30 to 80 or 100 pounds is provided while providing optimum occupant comfort. The resulting invention attempts to address the fit issue of a wide weight range of children and the ease and convenience of how that fit is achieved. The folding element of the invention allows easier consumer transport, less expensive freight and packaging costs, and reduced retail shelf space requirements.

This folding booster is comprised of a folding child's belt positioning booster car seat with adjustable height back. Additional features include an armrest and cup holder, both on each side of the seat. This folding booster is comprised of two main molded folding components, a seat and an adjustable height positioning back assembly. They are joined at a main pivot directly behind and slightly above the lap belt recesses. This pivot allows the back and seat sections to fold toward each other, permitting the seat to be transported more easily than a non-folding seat because of the smaller size. This reduction in size requires a package roughly half the size of a typical non-folding seat, which is very beneficial for packaging and freight cost savings as well as minimizing retail shelf space at the consumer store location.

The fixed part of the back assembly is coupled to the seat component of the restraint just above the seating surface and directly behind the lap belt recesses. The fixed back and seat are coupled such that they share a common axis that allows the fixed back and seat to pivot and fold toward each other. The seat and back assembly are each shaped such that they share a common axis that allows the fixed back and seat to pivot and fold toward each other. The seat and back assembly are each shaped such that they nest when folded together, allowing a compact fold.

The fixed back is constructed with all areas parallel to a central axis or spine of the back. The adjustable back is attached over the top or in front of the fixed back. The inner contour of the adjustable back mates with the outer contour of the fixed back that is parallel to the central axis or spine. The inner contour of the movable back is also parallel to the central axis or spine as it nests with the outer contour of the fixed back. The outer contour of the movable back need not be parallel to the central axis.

The surfaces that comprise the fixed back outer contour consist of a generally flat back surface and winged or forward protruding surfaces that extend the length of the back surface and offer side support to the seat occupant. The form of the fixed back may take any shape that permits a telescoping motion with the adjustable back. The movable back is attached to the fixed back so it can slide or telescope along the fixed back in a defined range of motion. This range of motion is defined by the shoulder heights of the seat occupants as is required by a 30 to 80 or 100 pound child.

Approximately one-third of the way down the movable back from the top are two generally horizontal and symmetrical slots that intersect the back surface from the sides. These slots allow the auto shoulder belt to penetrate the seat back and be positioned directly above the occupant's shoulder. Each slot has a hook that aids in retaining the auto belt within the slot. The defined range of motion of the movable back permits the proper positioning of these slots to fit the shoulder heights of the children within the seat's occupant weight range. The entire movable back moves as is required to properly position the shoulder belt slots for the occupant. A means for incrementally adjusting and maintaining the height of the movable back is locate behind the movable back.

Directly above the shoulder belt slots is a contoured headrest area with wings or surfaces that extend generally forward, away from the back seating surface and provide head protection and support. The entire inner surface of the headrest area is lined with energy absorbing foam, e.g., expanded polystyrene. Because the headrest area is integral to the movable back, when the shoulder belt slots are properly positioned for the occupant, the headrest is automatically positioned and the contiguity of the surface is maintained.

Armrests are located on both sides of the seat, attached to the main seat fold pivot. The armrests can be positioned up or down via a pivoting attachment and share the same pivot axis as the main seat fold. In an optional embodiment, the armrests also serve as locks to control the seat fold. In this locking embodiment, the mechanism inside each armrest hub consists of a plunger than can engage both the seat and the fixed back preventing their rotation about the main pivot. Rotating an armrest up, cams the plunger out of mutual engagement with the seat and fixed back and no longer prevents rotation. Both armrests must be in the same up or down position to allow or prevent rotation.

A latch behind the fixed back near the main seat pivot area prevents the seat from folding inadvertently. This spring biased latch must be released from engagement with the rear of the seat component before the fold can be initiated. The arm rests must be in their up (unlocked) position as well prior to the seat being folded in the optional locking armrest embodiment.

When the seat is folded, i.e., the back generally parallel to the seat, the armrests can both be rotated to their down or locked position, which will mutually engage the seat and fixed back in this position and prevent rotation. The shape of the seat and fixed back in the main pivot area allow the folded seat to stand upright like a suitcase for convenience. To unfold the seat, both armrests must be folded up to the unlocked position to allow the seat and the fixed back to rotate freely.

The order in which the pivoting components are actuated in the optional locking armrest embodiment, ensures that whoever is folding the seat is not accidentally pinched by the scissor action of the seat back and armrests as they would approach each other if the fold were initiated when the armrests were in the down position.

Under the seating surface on both sides of the seat are cup holders that extend outward individually and provide areas for beverage or snack storage. Molded detents maintain the stored or extended positions of the cup holders. The cup holders are retained by a molded plate that has a smooth surface on the bottom that helps protect auto upholstery.

In one aspect of the present invention, the foldability of the car seat permits ease of transportation, economical packaging, shipping and low retail shelf space requirements and consumer benefits from the standpoint of ease of transporting the car seat from location to location.

In another aspect of the invention, parallel walls on the seating surfaces allow adjustment of the whole seat back to fit children of varying physical characteristics, and not through only adjustment of the headrest.

These and other objects of the present Invention will become more readily apparent from a reading of the following detailed description taken in conjunction with the accompanying drawings wherein like reference numerals indicate similar parts, and with further reference to the appended claims.

BRIEF DESCRIPTION OF DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Figure 1:
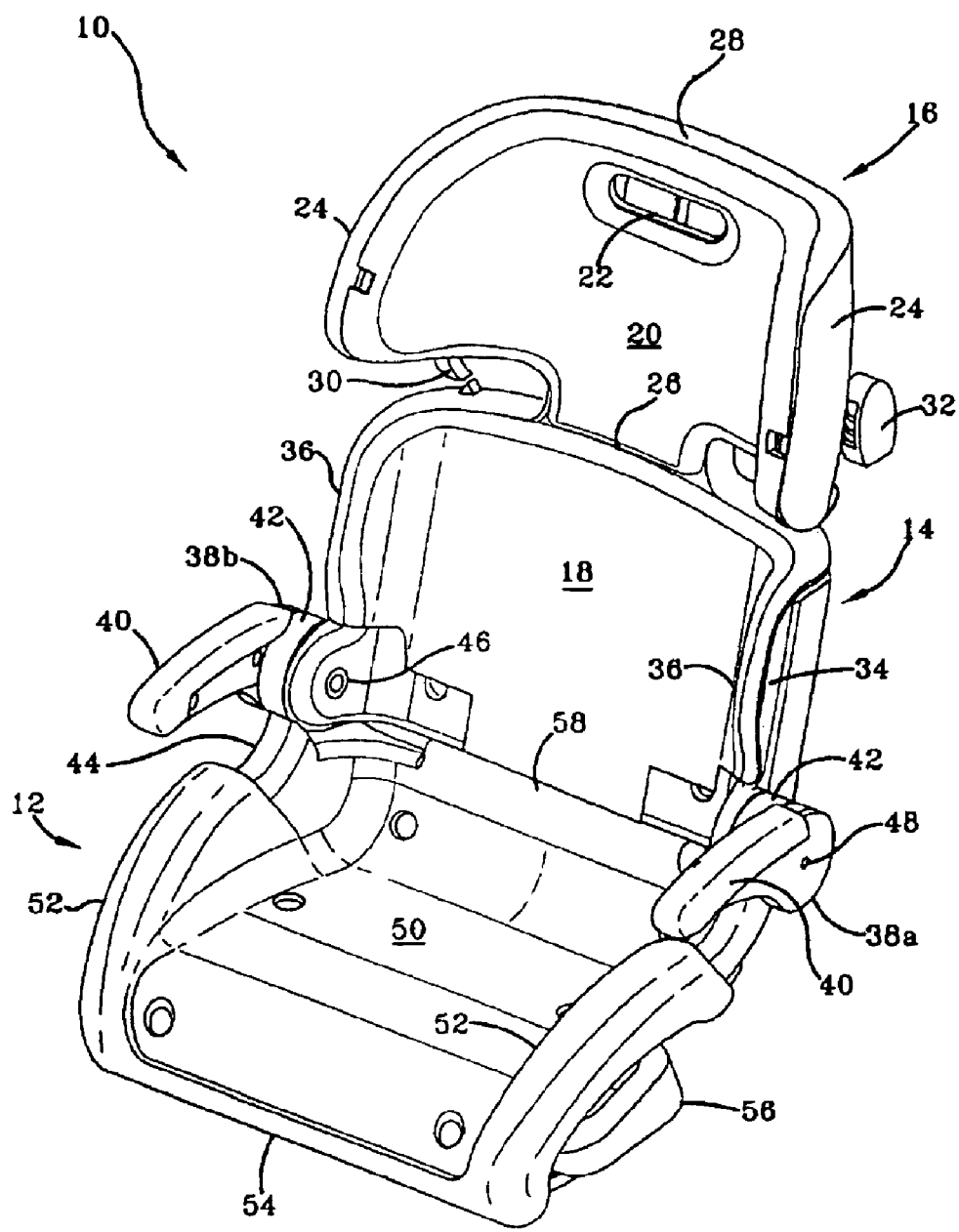
FIG. 1 is a front perspective view of a foldable car seat with extendable seat back showing the movable portion of the seat back in a fully collapsed position.

Referring now to the drawings wherein the showings are for purposes of illustrating the preferred embodiment of the invention only and not for purposes of limiting the same, the figures show a collapsible car seat with an adjustable back to better accommodate occupants of different heights and weights. In one optional embodiment of the invention, the car seat will pivot only through the selective positioning of the two handles, while in a second embodiment, this selective locking feature is not present.

Figure 2:
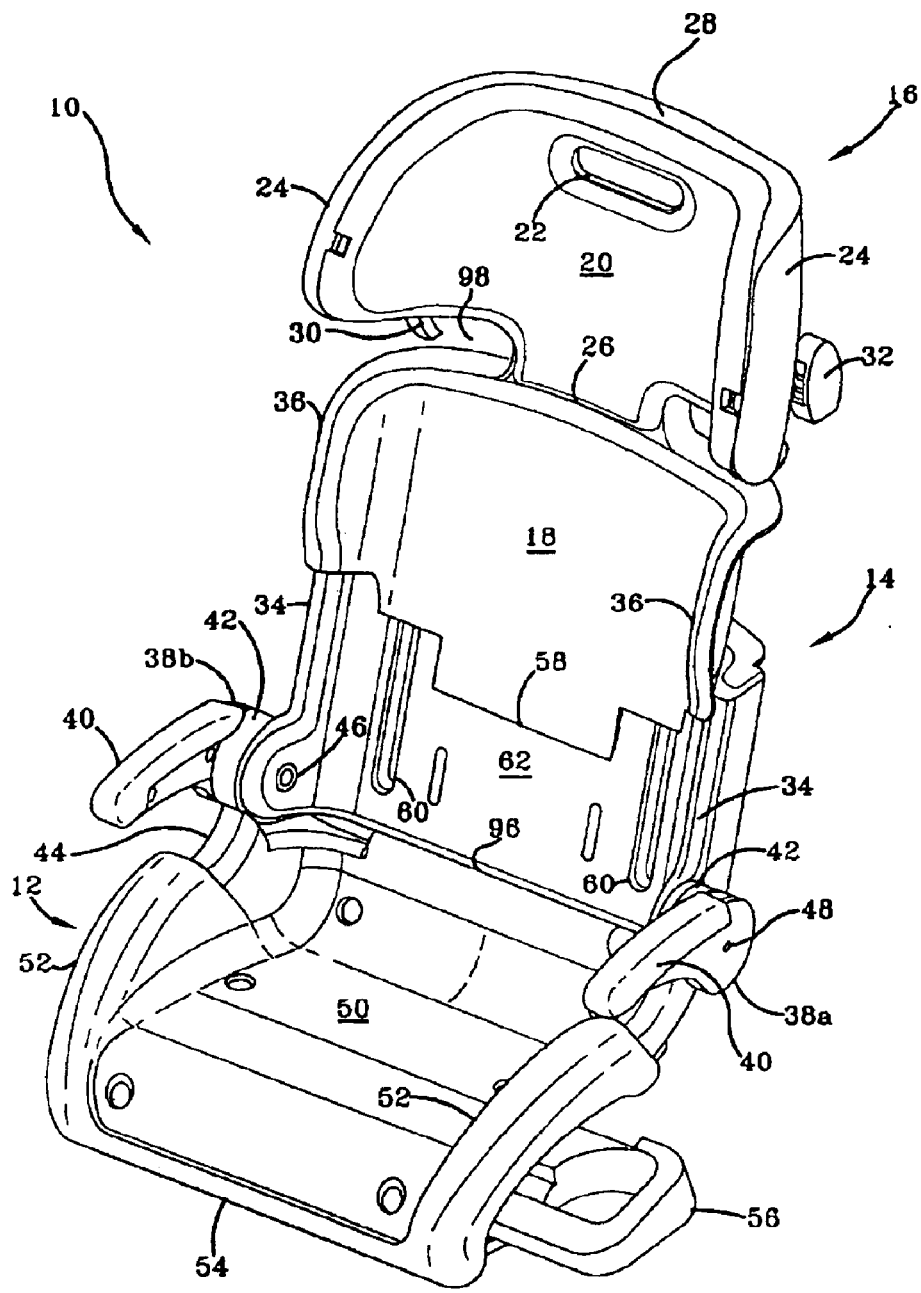
FIG. 2 is a front perspective view of FIG. 1 illustrating the movable portion of the seat back in an expanded position.

As illustrated in FIG. 1, car seat 10 has a fixed back member 14, a positionable or movable back member 16 and a seat member 12, the fixed back member pivotally connected to seat member 12 by a pair of pivot pins 48 and retaining washers 46 to which pivotable handles 38a, 38b are positioned on opposite sides. As better shown in FIGS. 2–3, fixed back member 14 further comprises a seat back 62, a pair of raised seat back sides 34, a curvilinear top ledge 74 having a vertically extending locking member 78 having a plurality of vertically spaced apart indentations 80 disposed thereupon, and a seat back bottom edge 96. Fixed back member 14 additionally has at least one, preferably a pair of vertically extending spaced apart slots 60 which facilitate sliding or telescoping movement, yet retain engagement with movable back member 16 by screws 126 and washers 127. This movable member comprises a seat back 18, a pair of raised seat back sides 36, a top 28 and a bottom edge 58. Disposed between top 28 and bottom 58 edges, are a pair of inwardly extending apertures 98 creating a neck region 100 with retaining means 30 for securing a vehicle shoulder belt therein. Between neck region 100 and top edge 28, is positioned headrest area 72 having opposed raised sides 24 for positioning about a head of an occupant user of the car seat. In one embodiment, headrest area 72 will have a foam liner 20 for positioning thereupon and in mating engagement with headrest area 72, raised lateral edges 102 for mating engagement with similarly geometried raised lateral edges 24, top edge 104 for mating engagement with top edge 28, and bottom edge 26 for overlap with neck region 100. To facilitate transport of car seat 10, is aperture 22 positioned within movable back member 16 toward top edge 28.

Figure 16:
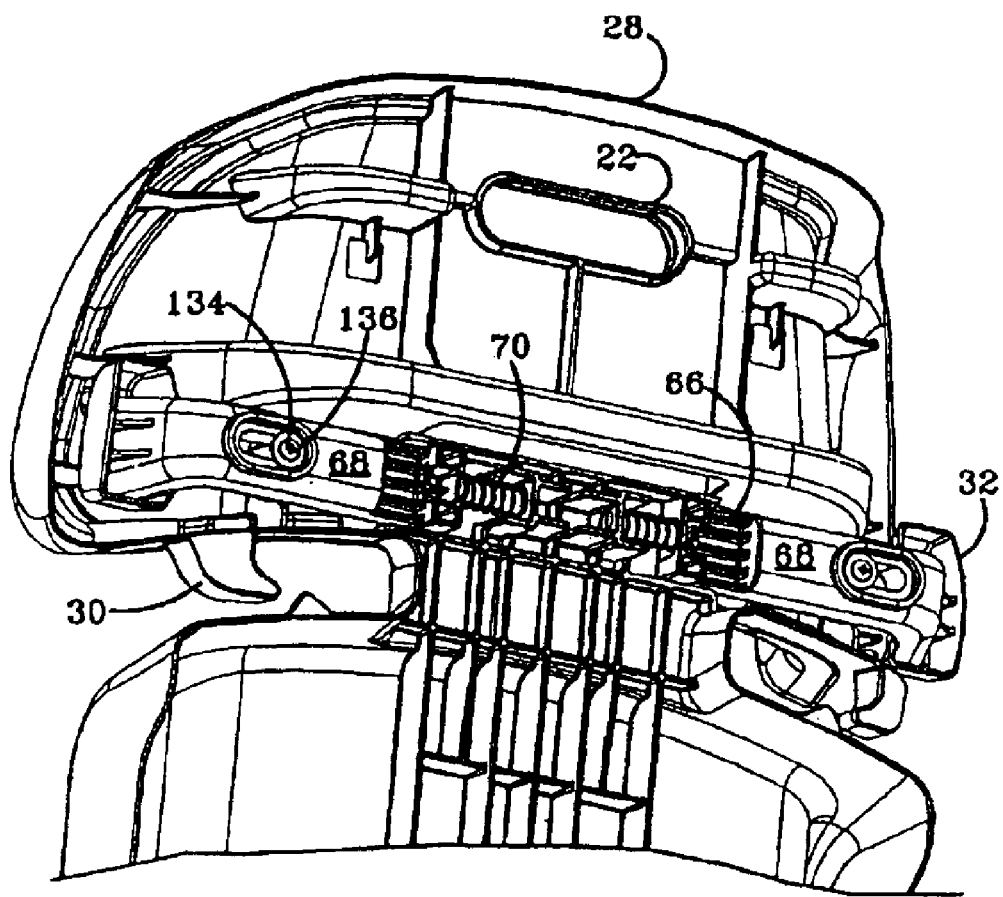
FIG. 16 is a rear perspective view of the adjustment mechanism of the movable component of the back assembly.

Optimal adjustment of headrest area 72 in conjunction with foam liner 20 is effected by essentially vertical telescoping movement of movable back member 16 adjacent fixed back member 14 by inward compression of handles 32 of locking member shafts 66 which are normally outwardly biased through the interaction of springs 70 on shafts 68 in communication with spring stops on moving back 16 as illustrated in FIG. 16. Inward compressive movement disengages rearward facing teeth or serrations or projections 64 from interlocking engagement with corresponding indentations or grooves 80 thereby permitting vertical height adjustment of movable back member 16. Removal of the compressive force on locking member handles 32 results in re-locking engagement of teeth 64 with corresponding indentations 80.

Figure 5:
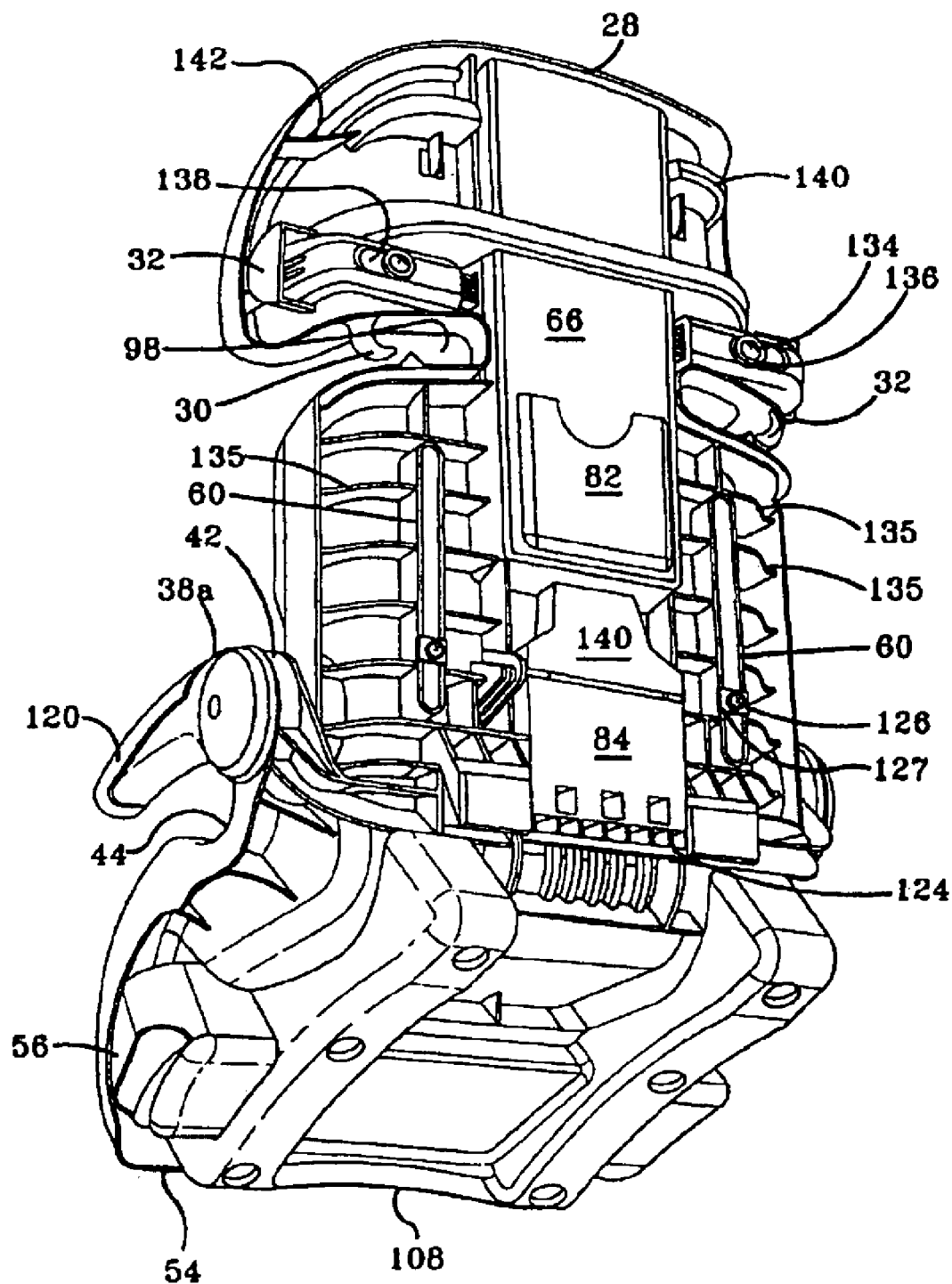
FIG. 5 is a rear perspective view of the foldable car seat of FIG. 1.
Figure 13:
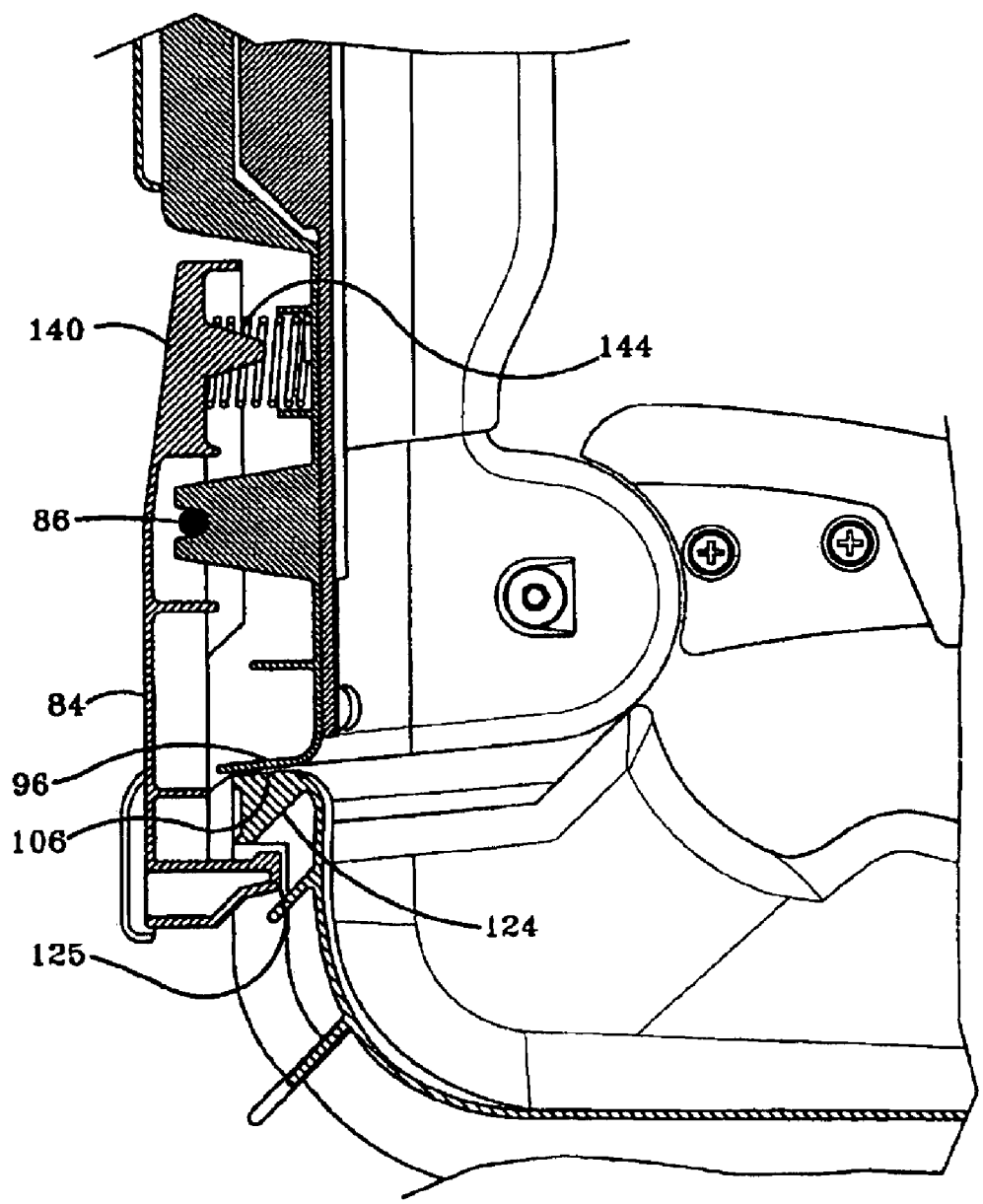
FIG. 13 is an exploded view shown in partial cross-section of the car seat latch.

As better illustrated in FIG. 5, the rear of fixed and movable seat back sides is generally hollow, optionally with a plurality of ribs 135 for structural integrity in the fixed back member 14 as well a plurality of ribs 140, 142 in the movable back member 16 for additional structural integrity. Fastening means such as a washer 136 and a screw 134 maintain locking member handles 32 onto movable back member 16 yet permit compressive movement normal to the vertical axis of the back of the car seat within slot 138. Locking engagement of the fixed and movable back of car seat 10 is effected by pivotal movement of outwardly spring biased 141 handle 140 of latch 84 about pivot pin 86 with latch projection 125 securing a lip 124 of car seat member 12 as best illustrated in FIG. 13. Downward projections 76 function as legs for car seat 10 when in its collapsed or folded position. Collapsing of the car seat backs to the seat or seat to the backs, involves releasing latch 84 followed by clockwise rotational movement of seat member 12 toward fixed back member 14 and movable back member 16. Phrased alternatively, and equivalently, the rotational movement may be thought of as counterclockwise if fixed back member 14 and movable member 16 are rotated toward seat member 12. Uncollapsing or unfolding is automatic as latch 84 overrides lip 125 of car seat member 12 and snaps into place beyond lip 124. Optionally, instruction pouch 82 is affixed to the rear of fixed back member 14.

Figure 4:
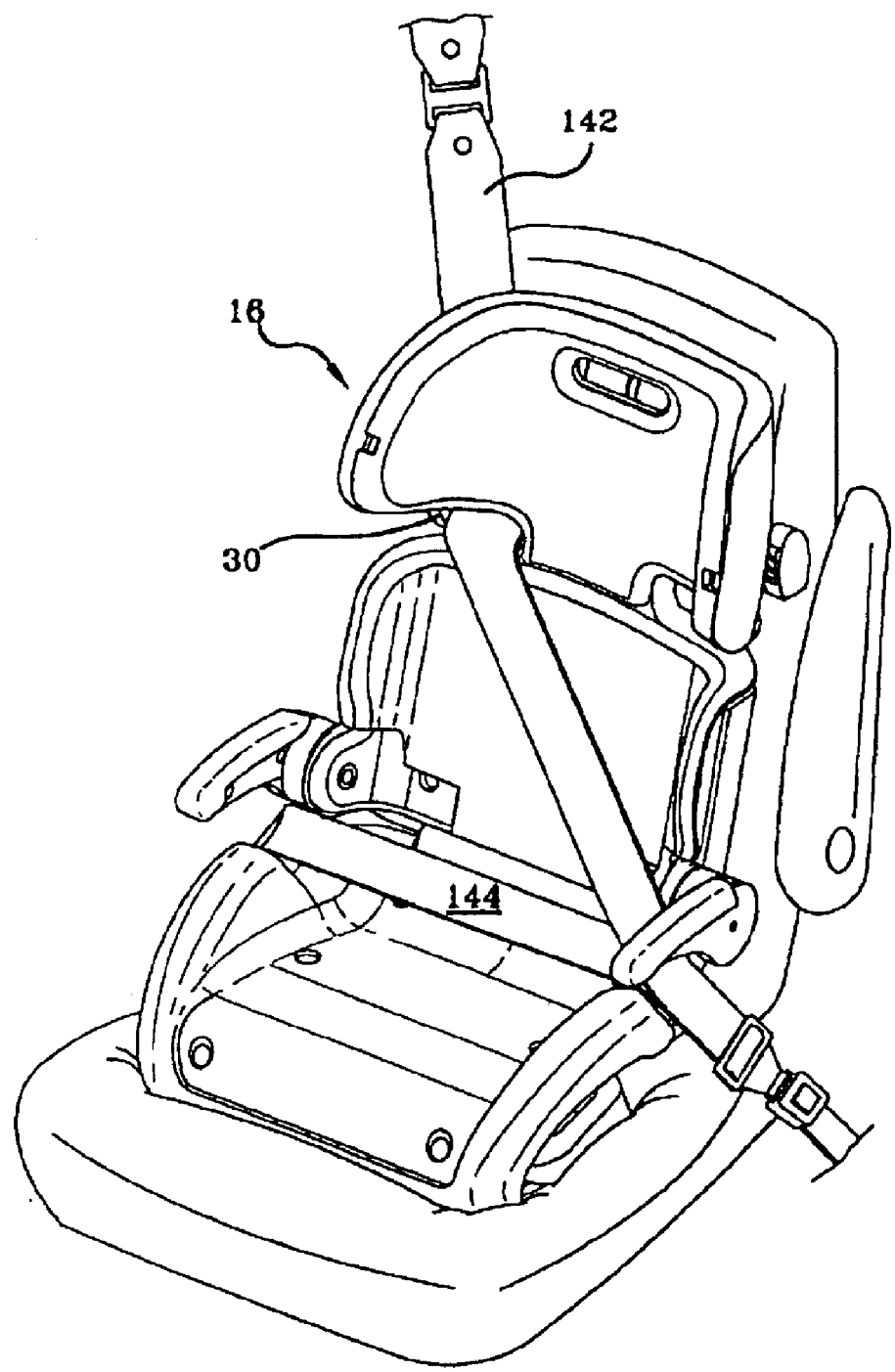
FIG. 4 is a perspective view of FIG. 1 illustrating the positioning of the vehicle seat belts with the car seat.

As illustrated in FIG. 4, movable seat back side 16 has a shoulder belt guiding device 30 affixed to headrest area 72 and defines an apertured opening 98 for retention of the shoulder belt 142 regardless of where movable back 16 is positioned. Additionally, lap belt 144 is guided and positioned appropriately on a user's pelvic area by recessed areas 44 on either side of seat member 12.

Figure 3:
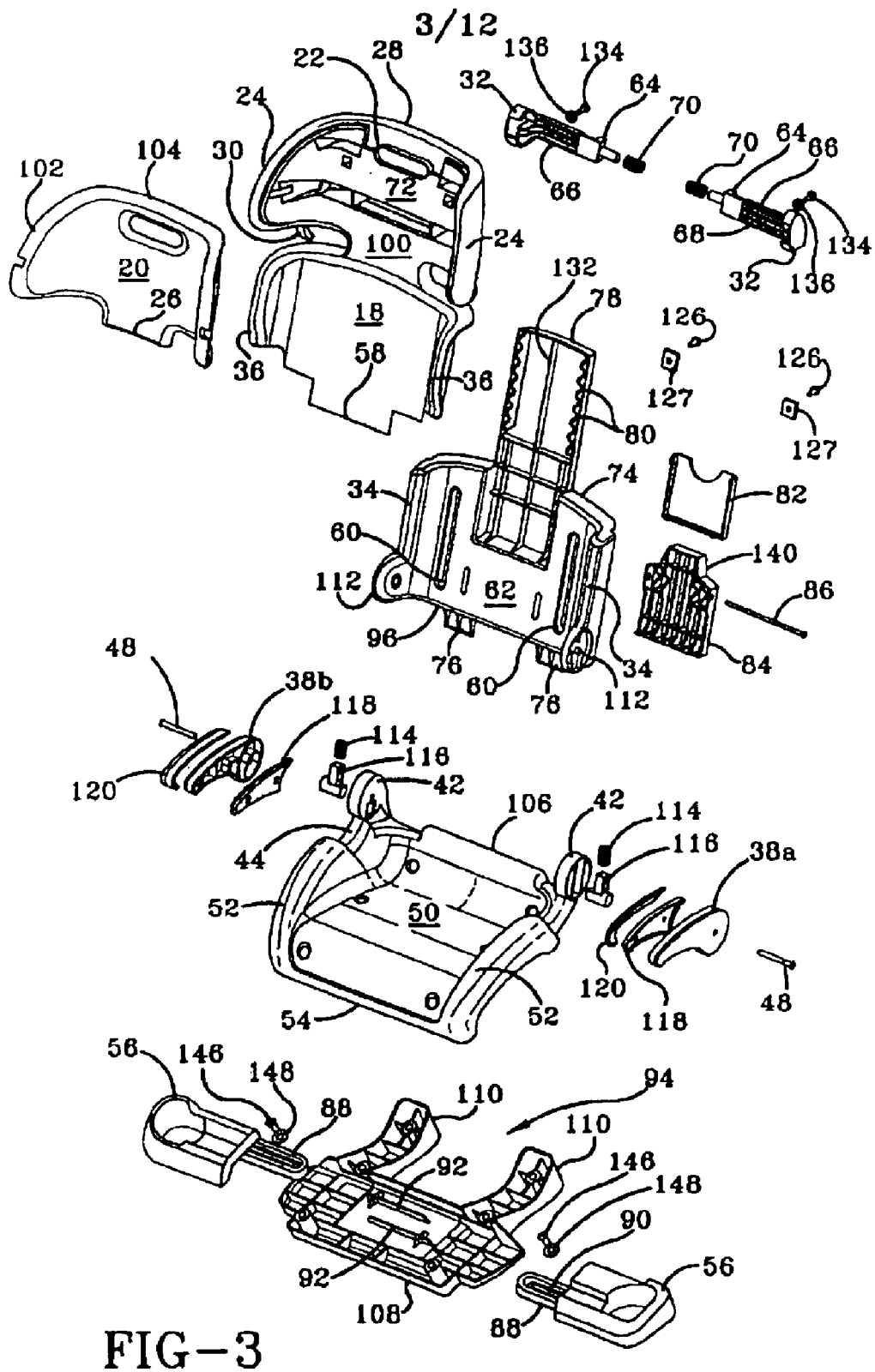
FIG. 3 is an exploded view of FIG. 1.

Seat member 12 further comprises a curvilinear seat bottom 50, a pair of raised bottom sides 52, each side generally being hollow and having a front side 54 and a rear side 106. At the front of the base of seat member 12 is seat protection member 94 which has a generally rectangular base 108 with a pair of rearwardly extending leg members 110. Seat member 12 optionally has a recessed portion 44 for positioning of a lap belt 144 correctly across the body of an occupant. In one embodiment, and optionally, a pair of retractable cup holders 56 are insertable into seat protection member 94 and secured by tracks 92 which interface with slots 90 within projections 88, retained by washers 148 and screws 146. While a horizontal engagement is illustrated in FIG. 3, it should be noted that other arrangements are envisioned within the scope of this invention, e.g., pivoting cup holders. As better illustrated in FIG. 3, rotational armrests 40 positioned on either side of the seat comprise an outer housing 38a or 38b, an inner plate 118 and an exterior cover 120 fixedly attached to the car seat by pivot pin 148.

Figure 6:
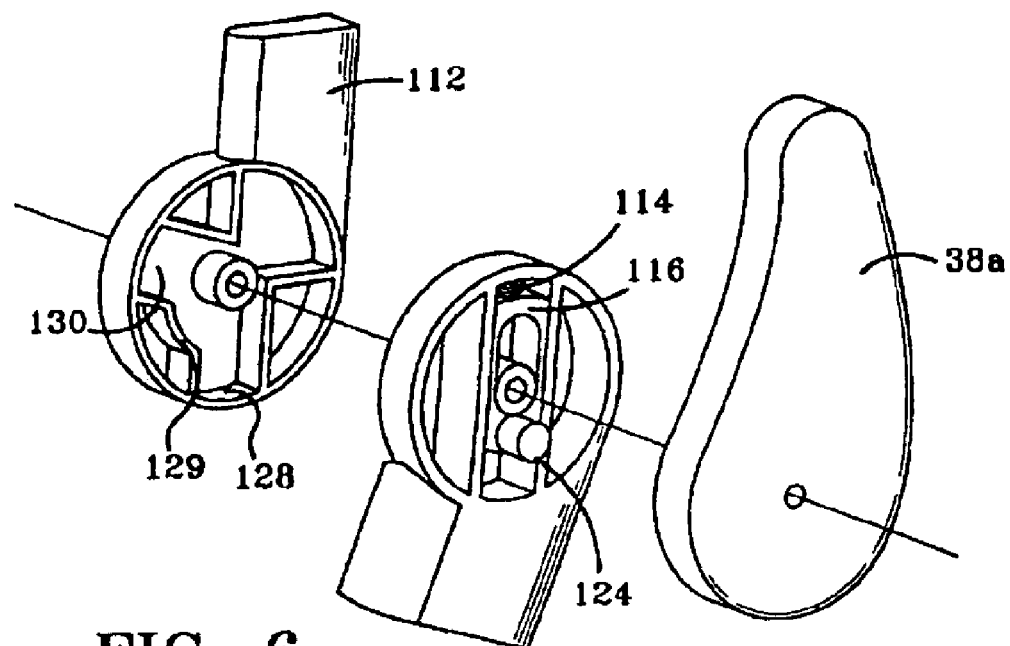
FIG. 6 is right perspective view of an armrest interfacing with a cam surface upon rotational movement therewith illustrating the seat back side and armrest in their upright position.
Figure 7:
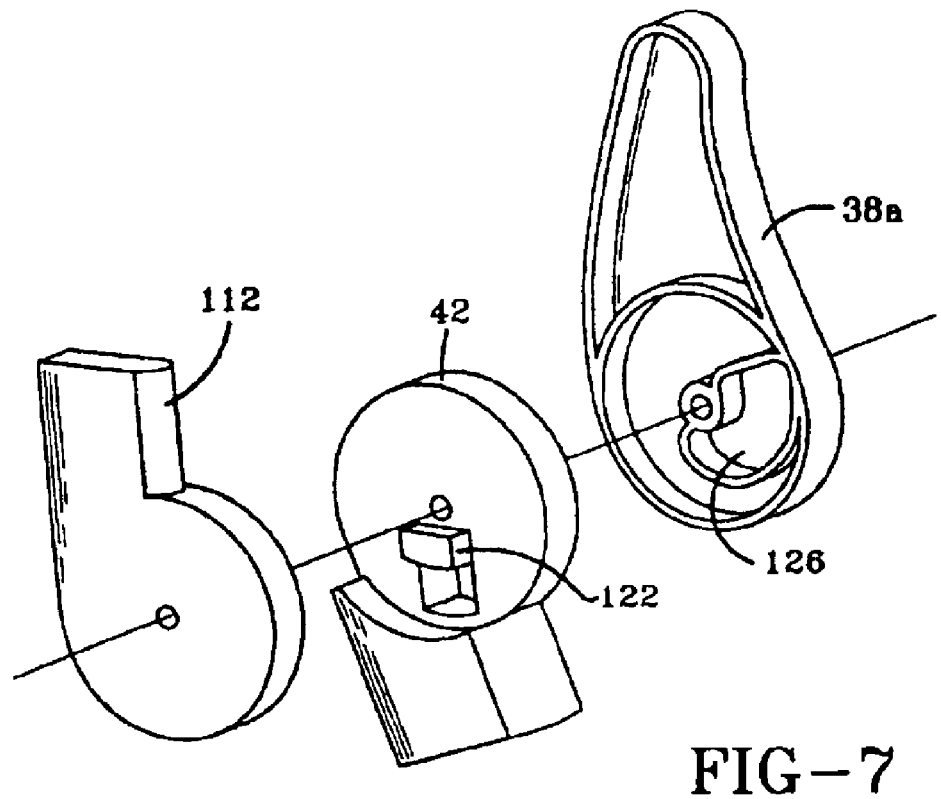
FIG. 7 is a left perspective view of FIG. 6.

Bottom seat member 12 and fixed back member 14 are secured together by a pair of pins 48 securing back cylindrical housing 112, seat cylindrical housing 42 and outer armrest 38 together encapsulating sliding latch 116 therein. As illustrated in FIGS. 6–7, with armrest 38 in an upright an unlocked position, sliding latch extension 122 is in its elevated unlatched position 129 in back cylindrical housing 112 due to the movement of cam follower 124 in contact with cam surface 126 of armrest 38a. Raising the armrest handle 38a allows cam surface 126 to act on cam follower 124 on the sliding latch 116 compressing the spring 114 and allowing free rotation.

Figure 8:
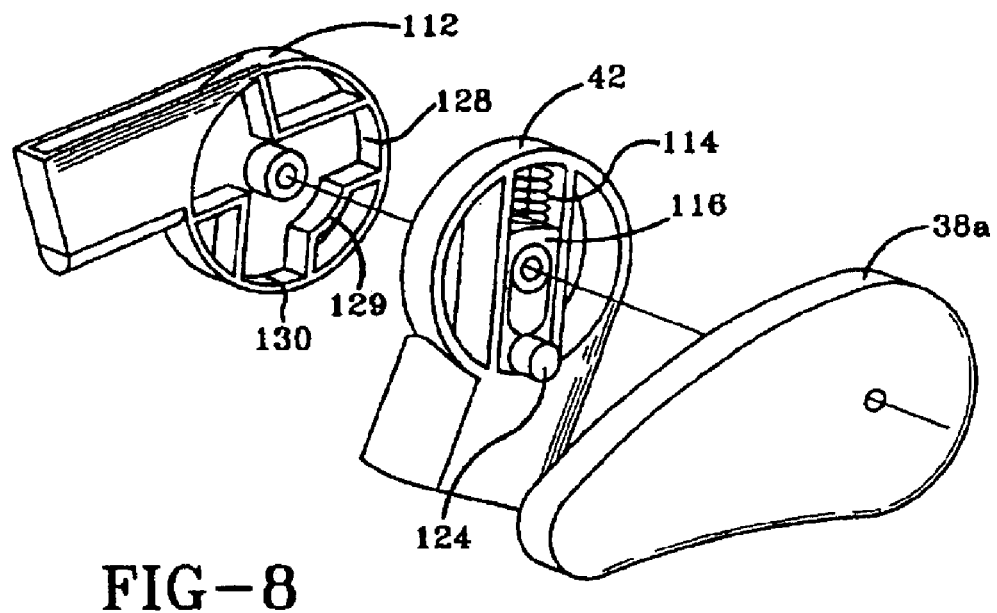
FIG. 8 is a right perspective view similar to FIG. 6 illustrating the seat back side and armrest in a horizontal position.
Figure 9:
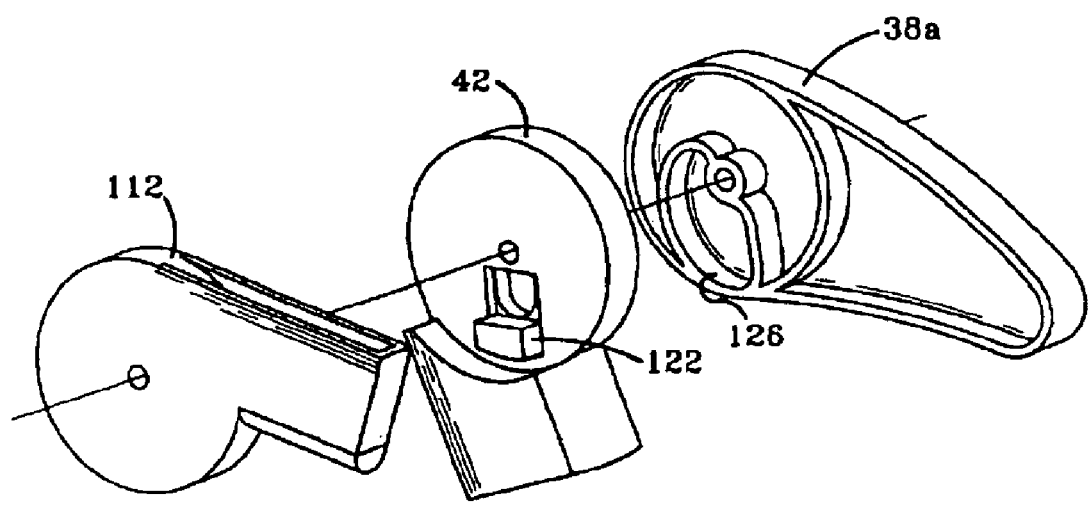
FIG. 9 is a left perspective view of FIG. 8.
Figure 10:
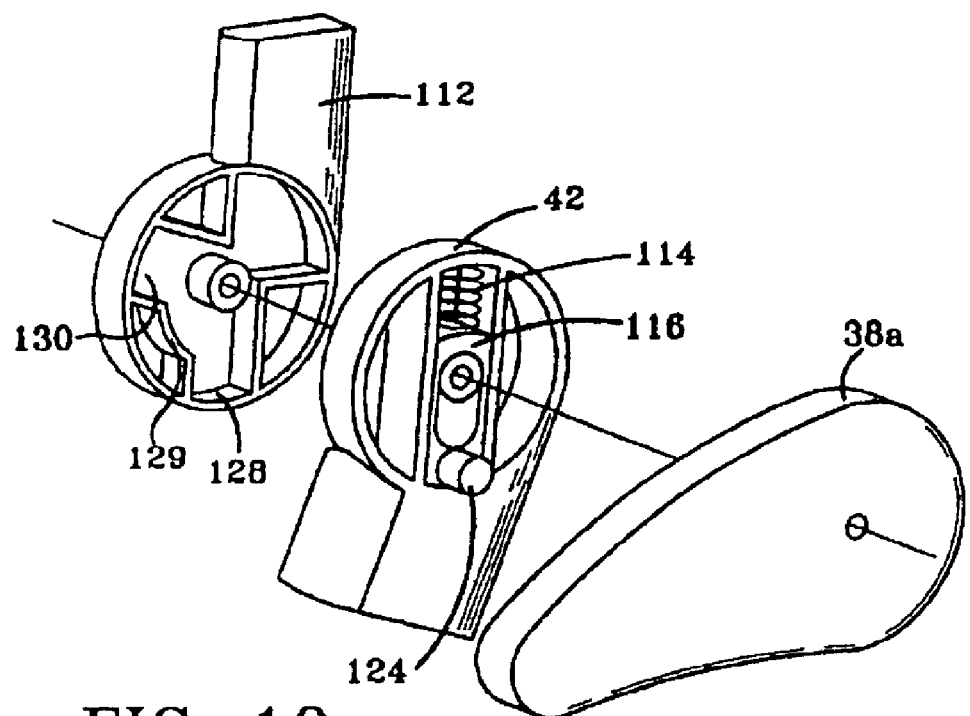
FIG. 10 is a right perspective view similar to FIG. 6 illustrating the seat back side in an upright position and the armrest in a horizontal position.
Figure 11:
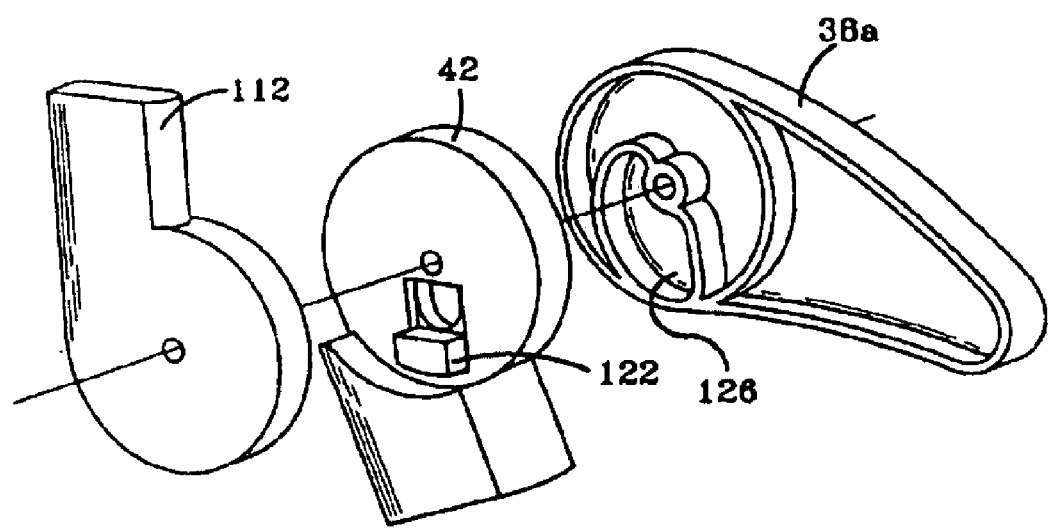
FIG. 11 is a left perspective view of FIG. 10.

In FIGS. 8–9, due to the spring 114 biasing sliding latch 116 in a downward direction, sliding latch 122 engaged with the folded latched position 130 of the seatback hub, the seat is in a latched folded position. Once again, as illustrated in FIGS. 10–11, with the fixed seat back unfolded and armrest 38a in a locked position due to the relationship of cam surface 126 with cam follower 124, coupled with the spring biasing, sliding latch 116 is fixed into a non-rotating position on the seat back hub. Thus, it can be seen that only when the armrest 38a is in the upright position, is rotational movement possible due to the interaction of the cam surface upon cam follower 124 moving sliding latch into unlatched position 129 on seatback hub 112.

Figure 12:
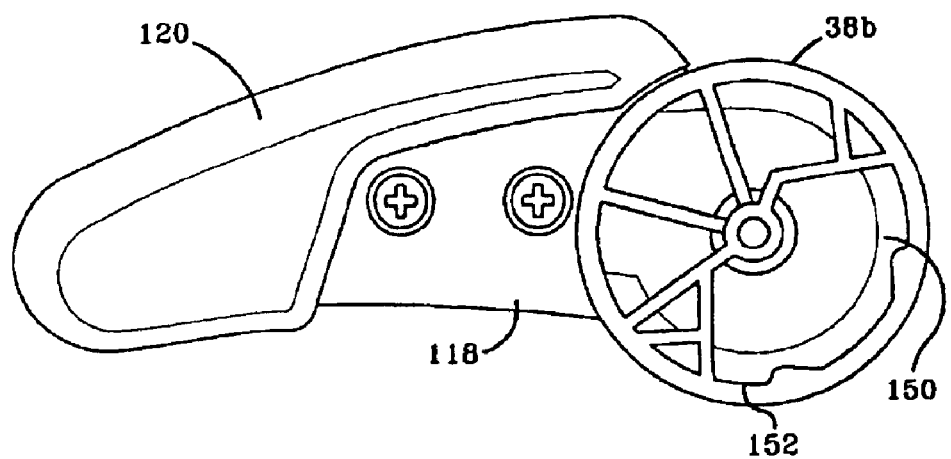
FIG. 12 is a side elevational view of an alternative embodiment illustrating two low-level detents in the hub.
Figure 14:
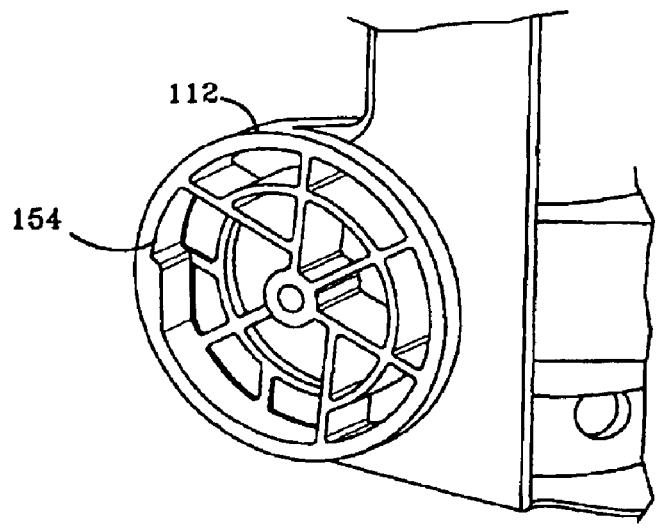
FIG. 14 is a side perspective view of a fixed back hub.

Alternatively, the ability to selectively rotate the armrest to effect collapsing of the carseat, a feature which minimizes the ability to pinch a finger upon performing the collapsing motions, need not be present as illustrated in FIG. 12 wherein cam follower 124 follows the cam surface 126 in the armrest and detents in either detent 150 or 152 on one side and operates in a similar manner in the armrest on the other side for the purpose only to allow the armrest an up or down detented position. As shown in FIG. 14, the raised area on back cylindrical housing 112 is also reduced in height to where sliding latch extension 122 can override it thus detenting the back at position 154 and not locking it.

Figure 15:
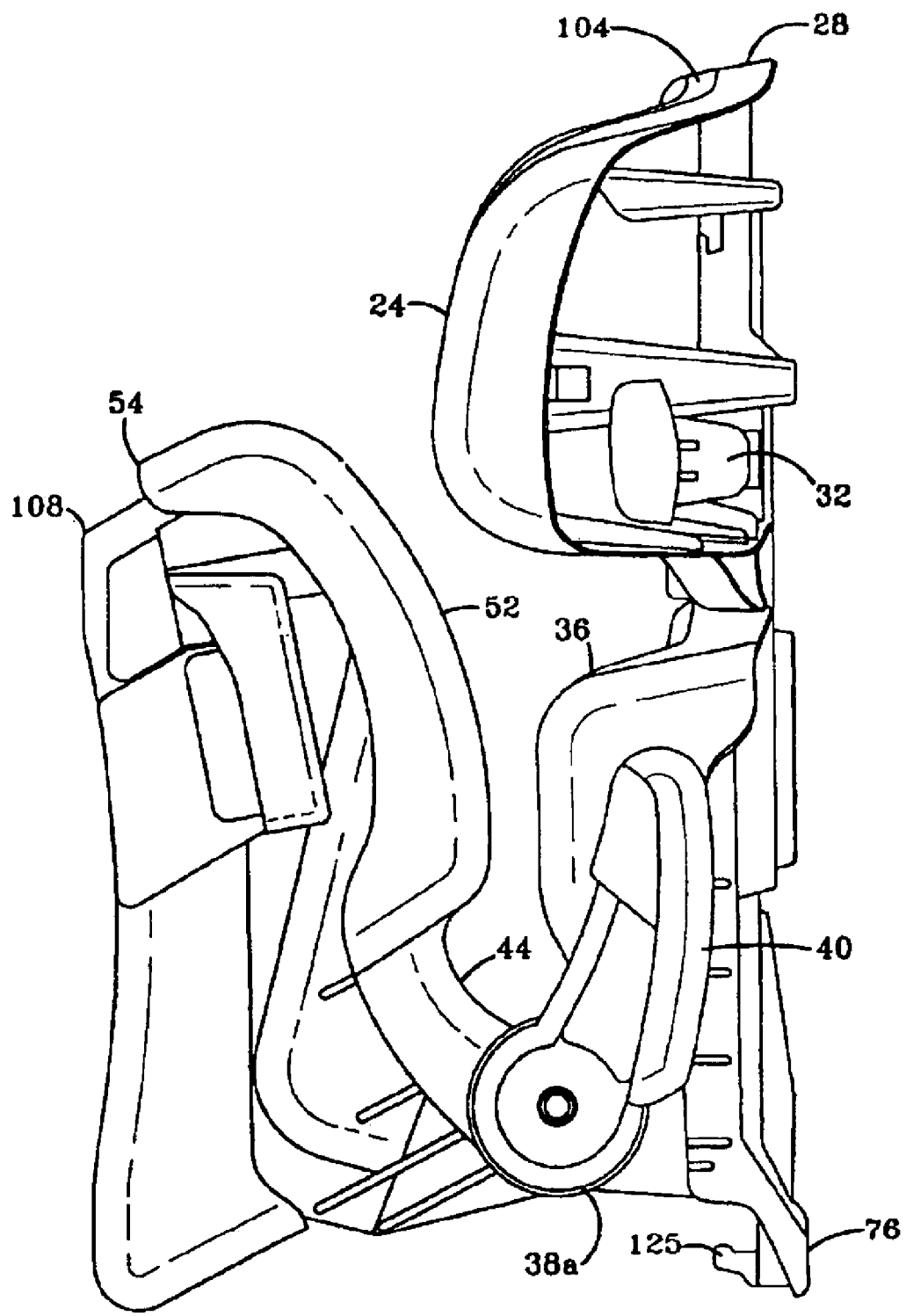
FIG. 15 is a side elevational view of the car seat in a folded or collapsed position.

When car seat 10 is in its fully collapsed position, the seat back assembly and seating surface nest, thereby allowing a compact fold, as illustrated in FIG. 15 still leaving sufficient gap between armrest handle 40 or raised seat back sides 36 and raised bottom sides 52 to not pinch an individual who is collapsing the car seat.

In manufacture, the car seat 10 is typically made of plastic, preferably polyolefin, more preferably rubber modified polypropylene and covered with a fabric, typically including a foamed backing material for the occupant. A non-exhaustive list of possible plastics would include polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

More specifically, polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene /isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly-(α-methylstyrene), copolymers of styrene or. alpha. -ethylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, include acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

This invention has been described in detail with reference to specific embodiments thereof, including the respective best modes for carrying out each embodiment. It shall be understood that these illustrations are by way of example and not by way of limitation. Accordingly, the scope and content of the present invention are to be defined only by the terms of the appended claims.

What is claimed is:

1. A collapsible car seat which comprises:
   a seat member;
   a back member pivotally connected to said seat member, said back member further comprising:
      a fixed component;
      a movable component said movable component comprising an upper headrest area with a pair of forward extending wings and a lower area for sliding movement along said fixed component, said upper headrest area in invariant fixed relationship to said lower area; and
      said fixed and movable components in overlapping essentially gapless relationship with respect to each other with sliding movement between said components;
   means on said car seat for selectively positioning and retaining said car seat in either an essentially L-shaped first position or a second essentially collapsed position wherein a top of said seat member is adjacent to a front of said back member; and
   means for selectively positioning and retaining said movable component relative to said fixed component.

2. The seat of claim 1 wherein said back member and said seat member share a common axis that allows said back member and said seat member to pivot and fold toward each other.

3. The seat of claim 2 wherein said seat member and back member are shaped such that said seat member and said back member nest when folded together.

4. The seat of claim 2 wherein said movable component is attached in front of said fixed component.

5. The seat of claim 2 wherein an inner contour of said movable component mates with an outer contour of said fixed component.

6. The seat of claim 5 wherein said inner contour of said movable component nests with an outer contour of said fixed component.

7. The seat of claim 6 wherein said outer contour of said fixed component further comprises a pair of raised surfaces for side support of an occupant.

8. The seat of claim 7 wherein said fixed component and said movable component permit telescoping movement therebetween.

9. The seat of claim 8 wherein said telescoping movement is fixed by a length of at least one longitudinal channel in said fixed component.

10. The seat of claim 9 wherein said telescoping movement is fixed by a length of at least two longitudinal channels in said fixed component.

11. The seat of claim 9 wherein said movable component further comprises at least two generally horizontal and symmetrical slots that intersect said movable back from a pair of sides to allow a shoulder belt to penetrate through said movable component.

12. The seat of claim 9 wherein each slot has a hook to retain said shoulder belt within said slot.

13. The seat of claim 9 wherein said means for selectively positioning said movable component relative to said fixed component permits adjustment by incremental discrete movement.

14. The seat of claim 13 wherein said means for selectively positioning said movable component relative to said fixed component is a pair of outwardly biased shafts which engage locking means on said fixed component.

15. The seat of claim 14 wherein said locking means are mating teeth and grooves.

16. The seat of claim 9 wherein said means for selectively positioning said movable component relative to said fixed component permits infinitely variable movement.

17. The seat of claim 9 wherein a shoulder belt slots are is properly positioned when adjusted through the simultaneous movement of said slots with adjustment of said movable component.

18. The seat of claim 17 which further comprises a pair of armrests.

19. The seat of claim 18 wherein said armrests further comprise:
   at least one biased sliding latch having a laterally extending protrusion on one side of said latch; and
   a pair of detents for engagement with said laterally extending protrusion for securing said armrests in a first and a second position.

20. The seat of claim 19 which further comprises a generally flat-bottomed seat saver portion under said seat member.

21. The seat of claim 20 which further comprises a cup holder in said seat saver portion.

22. The seat of claim 19 wherein said movable member further comprises an aperture toward a top of said movable component.

23. The seat of claim 20 wherein said sliding latch further comprises:
   a laterally extending cam follower; and
   a cam surface having a geometry to effect axial movement of said sliding latch and said laterally extending protrusion.

24. The seat of claim 23 wherein said cam surface generates upward axial movement of said sliding latch when moving said armrest from a lowered position into a raised position thereby permitting pivotal rotational movement of laterally extending protrusion from a first detent position to a second detent position.

25. The seat of claim 24 wherein pivoting rotational movement is prohibited when said armrests are in a lowered position.

26. The seat of claim 1 wherein said means for selectively positioning said seat member from said essentially L-shaped first position to said second essentially collapsed position comprises a pivoting latch which prohibits rotational movement of said seat member toward said back member.

27. A collapsible car seat which comprises:
a seat member;
a back member pivotally connected to said seat member, said back member further comprising:
   a fixed component; and
   a telescoping movable component overlapping said fixed component, said telescoping movable component further comprising a fixed upper headrest area with a pair of forward extending wings and wherein movement of said components relative to each other provides contiguous support for an occupant's back; and
means on said car seat for selectively positioning and retaining said car seat in an essentially L-shaped first position or a second essentially collapsed position wherein a top of said seat member is adjacent to a front of said back member;
means for selectively positioning and retaining said movable component relative to said fixed component.

28. The seat of claim 27, wherein said back member and said seat member share a common axis that allows said back member and said seat member to pivot toward each other.

29. The seat of claim 28 wherein said seat member and back member are shaped such that said seat member and said back member nest when folded together.

30. The seat of claim 29 wherein said movable component is attached in front of said fixed component.

31. The seat of claim 30 wherein an inner contour of said movable component mates with an outer contour of said fixed component.

32. The seat of claim 31 wherein said inner contour of said movable component nests with an outer contour of said fixed component.

33. The seat of claim 31 wherein said outer contour of said fixed component further comprises a pair of raised surfaces for side support of an occupant.

34. The seat of claim 33 wherein said fixed component and said movable component permit telescoping movement therebetween.

35. The seat of claim 34 wherein said telescoping movement is fixed by a length of at least one longitudinal channel in said fixed component.

36. The seat of claim 35 wherein said telescoping movement is fixed by a length of at least two longitudinal channels in said fixed component.

37. The seat of claim 36 wherein said movable component further comprises at least two generally horizontal and symmetrical slots that intersect said movable component from a pair of sides to allow a shoulder belt to penetrate through said movable component.

38. The seat of claim 35 wherein each slot has a hook to retain said shoulder belt within said slot.

39. The seat of claim 35 wherein said means for selectively positioning said movable component relative to said fixed component permits adjustment by incremental discrete movement.

40. The seat of claim 39 wherein said means for selectively positioning said movable component relative to said fixed component is a pair of outwardly biased shafts which engage locking means-on said fixed component.

41. The seat of claim 40 wherein said locking means are mating teeth and grooves.

42. The seat of claim 35 wherein said means for selectively positioning said movable component relative to said fixed component permits infinitely variable movement.

43. The seat of claim 35 wherein said shoulder belt slots are properly positioned when adjusted through the simultaneous movement of said slots with adjustment of said movable component.

44. The seat of claim 43 which further comprises a pair of armrests.

45. The seat of claim 44 wherein said armrests further comprise:
   at least one biased sliding latch having a laterally extending protrusion on one side of said latch; and
   a pair of detents for engagement with said laterally extending protrusion for securing said armrests in a first and a second position.

46. The seat of claim 45 wherein said sliding latch further comprises:
   a laterally extending cam follower; and
   a cam surface having a geometry to effect axial movement of said sliding latch and said laterally extending protrusion.

47. The seat of claim 46 wherein said cam surface generates upward axial movement of said sliding latch when moving said armrest from a lowered into a raised position thereby permitting pivotal rotational movement of laterally extending protrusion from a first detent position to a second detent position.

48. The seat of claim 47 wherein pivoting rotational movement is prohibited when said armrests are in a lowered position.

49. The seat of claim 27 wherein said means for selectively positioning said seat member from said essentially L-shaped first position to said second essentially collapsed position further a pivoting latch which prohibits rotational movement of said seat member toward said back member.

50. The seat of claim 27 which further comprises a generally flat-bottomed seat saver portion under said seat member.

51. The seat of claim 50 which further comprises a cup holder in said seat saver portion.

* * * * *

UNITED STATES PATENT AND TRADEMARK OFFICE
CERTIFICATE OF CORRECTION

PATENT NO. : 6,908,151 B2 Page 1 of 1
APPLICATION NO. : 10/248998
DATED : June 21, 2005
INVENTOR(S) : Paul K. Meeker et al.

It is certified that error appears in the above-identified patent and that said Letters Patent is hereby corrected as shown below:

Column 2, line 2, delete --occupants "hip area-- and substitute therefor --occupant's hip area--

Column 2, line 9, delete --occupants" shoulder-- and substitute therefor --occupant's shoulder--

Column 10, lines 26-28, by delete --shoulder belt slots are is properly positioned when adjusted through the simultaneous movement of said slots with adjustment-- and substitute therefor --shoulder belt is properly positioned when adjusted through the simultaneous movement of said slot with adjustment--

Signed and Sealed this

Twenty-second Day of August, 2006

JON W. DUDAS
*Director of the United States Patent and Trademark Office*